United States Patent
Baek et al.

(10) Patent No.: US 8,358,139 B2
(45) Date of Patent: Jan. 22, 2013

(54) OPTICAL REPRODUCING APPARATUS CONNECTABLE TO OPTICAL PICKUPS AND METHOD OF CONTROLLING OPTICAL PICKUPS

(75) Inventors: Ji-seon Baek, Suwon-si (KR); Yukihiro Yamasaki, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 12/748,502

(22) Filed: Mar. 29, 2010

(65) Prior Publication Data

US 2011/0090777 A1   Apr. 21, 2011

(30) Foreign Application Priority Data

Oct. 15, 2009  (KR) .................................. 2009-98149

(51) Int. Cl.
*G01R 31/08* (2006.01)
(52) U.S. Cl. ......... 324/525; 324/522; 369/126; 369/152
(58) Field of Classification Search ......................... None
See application file for complete search history.

(56) References Cited

U.S. PATENT DOCUMENTS 5,559,442 A * 9/1996 Peier et al. ...................... 324/96

FOREIGN PATENT DOCUMENTS

WO   2004/057587 A1   7/2004

OTHER PUBLICATIONS

Extended European Search Report issued Feb. 10, 2011 for European Patent Application No. 10158596.6.

* cited by examiner

*Primary Examiner* — Minh N Tang
(74) *Attorney, Agent, or Firm* — Stanzione & Kim, LLP

(57) ABSTRACT

An optical reproducing apparatus connectable to optical pickups and a method of controlling an optical pickup thereof are provided. The optical reproducing apparatus measures resistance of an optical pickup on a port of a connection unit to which the optical pickup is connected, and determines the type of the optical pickup according to the measured resistance. Accordingly, optical reproducing apparatuses may be controlled according to the type of optical pickups, and manufactured using various optical pickups without checking the type of optical pickups, which allows convenient manufacturing of optical reproducing apparatuses.

17 Claims, 4 Drawing Sheets

OPTICAL REPRODUCING APPARATUS CONNECTABLE TO OPTICAL PICKUPS AND METHOD OF CONTROLLING OPTICAL PICKUPS

CROSS-REFERENCE TO RELATED APPLICATIONS

This application claims priority under 35 U.S.C. §119(a) from Korean Patent Application No. 2009-98149, filed on Oct. 15, 2009, in the Korean Intellectual Property Office, the contents of which are incorporated herein by reference in its entirety.

BACKGROUND

1. Field of the Invention

The present general inventive concept relates to an optical reproducing apparatus, and more particularly, to an optical reproducing apparatus to read out data from an optical disc and to reproduce the data.

2. Description of the Related Art

An optical pickup is a module which emits a light beam, reads out data from an optical disc, and outputs an electrical signal corresponding to the data, and is indispensable for an optical reproducing apparatus.

Usually, optical reproducing apparatuses and optical pickups are not manufactured by the same companies. Therefore, a manufacturer of optical reproducing apparatuses may purchase an optical pickup, mount it on an optical reproducing apparatus, and install firmware suitable for the optical pickup on a memory, to mass-produce optical reproducing apparatuses.

There may be times when it is inevitable to use various types of optical pickups, not a single type of optical pickup, under such a system of mass-producing optical reproducing apparatuses. For example, if an existing optical pickup has been discontinued, and only new versions of optical pickups are produced, other types of optical pickups have to be used.

In this situation, a manufacturer of an optical reproducing apparatus manufactures optical pickup reproducing apparatuses using various types of optical pickups. However, if the manufacturer installs wrong firmware on a memory, an optical pickup may not operate normally, consequently causing an optical pickup reproducing apparatus to operate abnormally.

Not only that, there are times when some of the elements constituting an optical pickup such as an optical lens (OL) and/or a laser diode (LD) is replaced with another type of elements, changing the characteristics of the optical pickup. The reason for such a replacement is to lower the cost of manufacturing an optical pickup or because there is an inventory shortage of elements.

However, if existing firmware is used in this situation, an optical pickup may not be driven normally, thereby causing an optical reproducing apparatus to operate abnormally.

SUMMARY

The present general inventive concept provides an optical reproducing apparatus to determine the type of optical pickup through resistance of an optical pickup connected to the optical reproducing apparatus.

The present general inventive concept also provides an optical pickup having a resistor which represents its type.

Additional features and utilities of the present general inventive concept will be set forth in part in the description which follows and, in part, will be obvious from the description, or may be learned by practice of the general inventive concept.

Example embodiments of the present general inventive concept may also provide an optical reproducing apparatus, including a connection unit connected to an optical pickup, and a front end to measure resistance of the optical pickup on a port of the connection unit, and to determine a type of the optical pickup according to the measured resistance.

The front end may measure resistance of the optical pickup on the port with power supplied to a printed circuit board (PCB) having the front end.

An end of the optical pickup on the port may be connected to ground.

The optical reproducing apparatus may further include a memory to store firmware in which margin set to drive the optical pickup is programmed differently according to the optical pickup, where the front end drives the optical pickup connected to the connection unit with the firmware stored in the memory according to the determined type of optical pickup.

The optical reproducing apparatus may further include a memory to store firmware to drive the optical pickup according to the type of the optical pickup, where the front end drives the optical pickup connected to the connection unit with one of firmware stored in the memory.

Example embodiments of the present general inventive concept may also provide a method of controlling an optical pickup, the method including measuring resistance of the optical pickup on a port among a plurality of ports connected to the optical pickup, and determining a type of optical pickup connected to an optical reproducing apparatus according to the measured resistance.

The measuring may measure resistance of the optical pickup on the port with power that the optical reproducing apparatus supplies to the port.

An end of the optical pickup on the port may be connected to ground.

The method may further include driving the optical pickup using firmware in which margin set to drive the optical pickup is programmed differently at least according to the determined type of the optical pickup.

The method may further include driving the optical pickup with firmware selected according to the determined type of the optical pickup.

Example embodiments of the present general inventive concept may also provide an optical pickup which to read out data from an optical disc, the optical pickup including a connection unit connected to an optical reproducing apparatus to transmit the data to the optical reproducing apparatus, and a resistor including an end connected to a port of the connection unit and resistance specifying a type of the optical pickup.

The resistance of the resistor may determine at least in part the type of the optical pickup of the optical reproducing apparatus.

The other end of the resistor may be connected to ground.

Exemplary embodiments of the present general inventive concept also provide a method of controlling an optical reproducing apparatus, the method including determining when an optical pickup is connected to a connection terminal of the optical reproducing apparatus, measuring the resistance of the connected optical pickup, and driving the optical pickup of the optical reproducing apparatus according to the measured resistance.

The method may also include reading out data from an optical disk with the driven optical pickup.

The method may also include outputting the read data with an output unit to an image output element of the optical reproducing apparatus.

The method may also include outputting the read data with an output unit of the optical reproducing apparatus to an external image output device.

Exemplary embodiments of the present general inventive concept also provide a method of controlling an optical reproducing apparatus, the method including selecting one of a plurality of optical pickups to connect to a connection terminal of the optical reproducing apparatus, measuring the resistance of the selected optical pickup, and driving the optical pickup of the optical reproducing apparatus according to the measured resistance.

The method may include selecting the one of the optical pickups from the plurality that includes at least one optical pickup mounted on the connection terminal and at least one optical pickup connected to the connection terminal.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
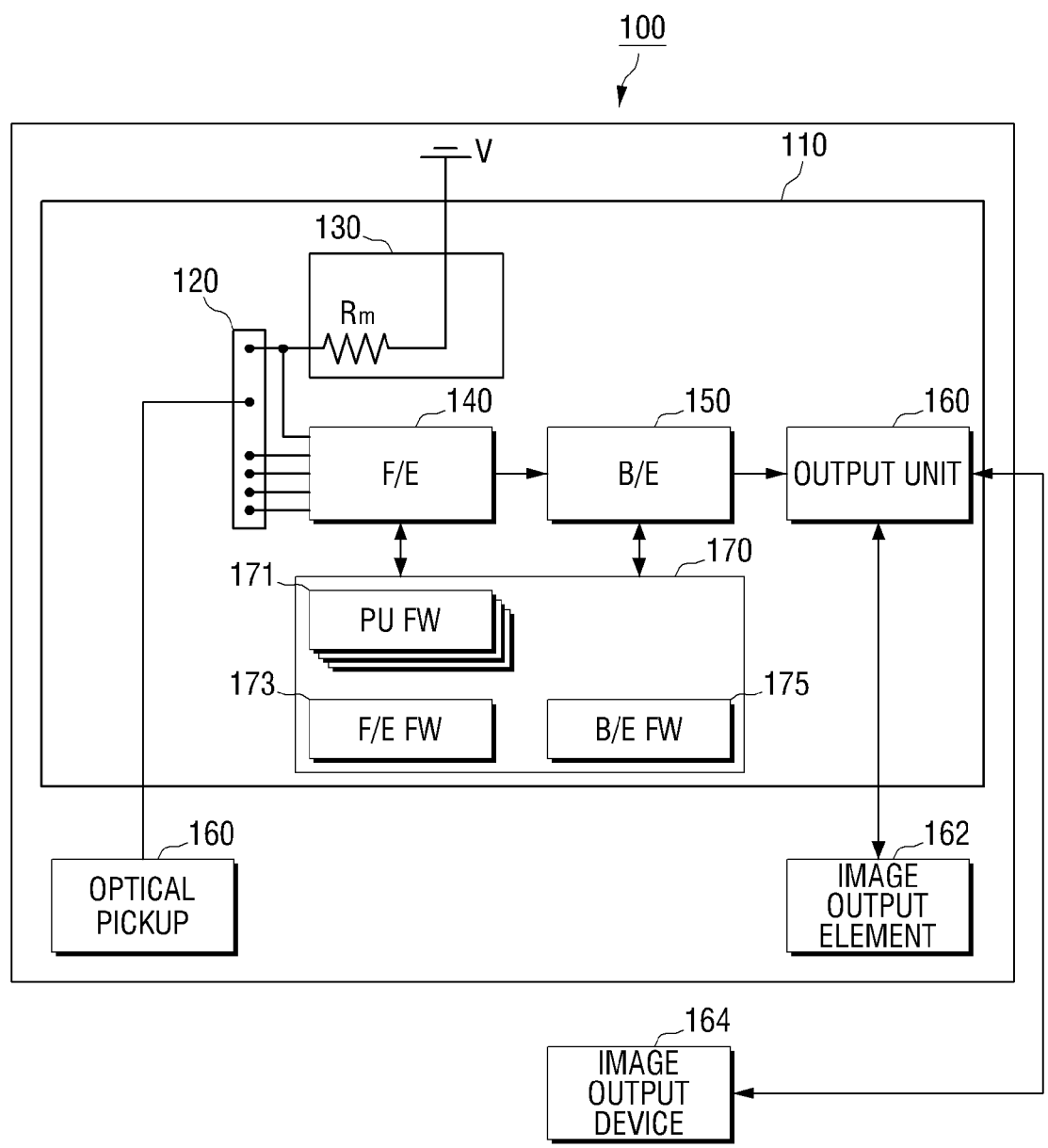
FIG. 1 is a block diagram illustrating an optical reproducing apparatus according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an optical reproducing apparatus according to exemplary embodiments of the present general inventive concept. As illustrated in FIG. 1, the optical reproducing apparatus 100 according to the exemplary embodiments of the present general inventive concept can include a printed circuit board (PCB) 110, a connection terminal 120, a power transferring circuit 130, a front end (F/E) 140, a back end (B/E) 150, an output unit 160, and a memory 170.

The connection terminal 120, the power transferring circuit 130, the F/E 140, the B/E 150, the output unit 160, and the memory 170 are placed on the PCB 110, and a plurality of wires and/or other suitable connection members that may carry out the exemplary embodiments as disclosed herein to electrically connect the connection terminal 120, the power transferring circuit 130, the F/E 140, the B/E 150, the output unit 160, and the memory 170 can be formed on the PCB 110.

An optical pickup (not illustrated) which will be explained below can be mounted on and connected to the connection terminal 120. Alternatively, the optical pickup may be an optical pickup 121 illustrated in FIG. 1 that may be connected to the connection terminal 120. The optical pickup can be connected to the F/E 140 via the connection terminal 120 to transmit data. Thus, the optical pickup may transmit data which is read out from an optical disc to the F/E 140.

The F/E 140 can perform signal processing on the data received from the optical pickup, and can generate an image signal. For example, the F/E 140 can perform error correction signal processing and/or any other suitable signal processing on data received from the optical pickup in order to carry out the exemplary embodiments of the present general inventive concept as disclosed herein. The B/E 150 can perform image signal processing on the image signal output from the F/E 140. For example, the B/E 150 can perform color correction, image sharpening, blur reduction, smoothing, and/or any other suitable signal processing on data received from the optical pickup in order to carry out the exemplary embodiments of the present general inventive concept as disclosed herein.

The output unit 160 may transfer an image signal output from the B/E 150 to an image output element 162 provided in the optical reproducing apparatus 100 and/or an external image output device 164. For example, the image output element 162 and/or the external image output device 164 may be any suitable display to form and display an image from the received image signal output from the B/E 150 in order to carry out the exemplary embodiments of the present general inventive concept as disclosed herein.

The memory 170 can include a storage space to store optical pickup firmware (PU FW) 171 to drive optical pickups (e.g., optical pickup 121), front end firmware (F/E FW) 173 to drive the F/E 140, and/or back end firmware (B/E FW) 175 to drive the B/E 150.

The F/E 140 can load the F/E FW 173 and can be driven by itself, and the B/E 150 can be driven by itself using the B/E FW 175. The F/E 140 can drive an optical pickup connected to the connection terminal 120 using the PU FW 171.

The power transferring circuit 130 can transfer power (V) supplied to the PCB 110 to one or more ports of the connection terminal 120 through a resistor (Rm). For example, the power transferring circuit 130 may selectively transfer power to one or more ports of the connection terminal 120.

Hereinabove, the optical reproducing apparatus 100 has been described in detail with reference to FIG. 1. It has been described that the optical pickup can be connected to the connection terminal 120 of the optical reproducing apparatus 100, but this is not limited thereto. Various optical pickups can be connected to the connection terminal 120 to carry out the exemplary embodiments of the present general inventive concept as disclosed herein.

Figure 2:
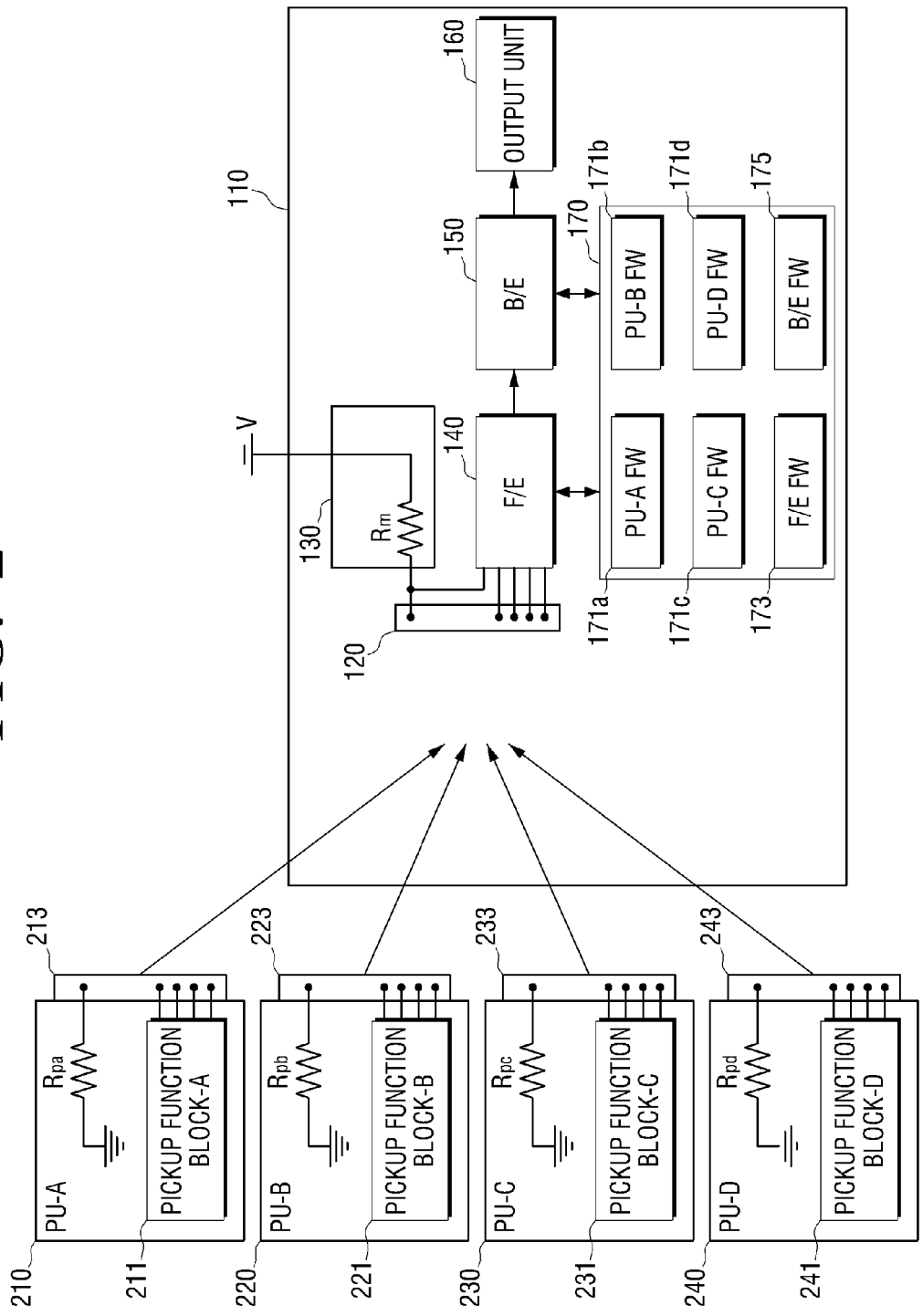
FIG. 2 is a view illustrating an optical reproducing apparatus to which different types of optical pickups are capable of being connected according to exemplary embodiments of the present general inventive concept.

As illustrated in FIG. 2, one or more different types of optical pickups (e.g., PU-A, PU-B, PU-C, and PU-D) 210, 220, 230, and 240 may be connected to the connection terminal 120 of the optical reproducing apparatus 100. The optical pickups 210, 220, 230, and 240 may be manufactured by different companies, may be manufactured by the same company but in different model types, may be manufactured by the same company and in the same model type but in different versions, may be the same model manufactured by the same company but having at least one differing characteristic because of variance in manufacturing, and/or any combination of the preceding optical pickups to carry out the exemplary embodiments of the present general inventive concept as disclosed herein.

As the optical pickups 210, 220, 230, and 240 can be of different types from one another, pickup function blocks 211, 221, 231, and 241 to read out data from an optical disc can have one or more different features.

As the pickup function blocks 211, 221, 231, and 241 can have different features, firmware to drive the optical pickups 210, 220, 230, and 240 can also be different from one another. The optical reproducing apparatus 100 can have firmware for one or more of the optical pickups 210, 220, 230, and 240 connectable to the connection terminal 120.

FIG. 2 illustrates the memory 170 of the optical reproducing apparatus 100 to store one or more of firmware 171*a*, 171*b*, 171*c*, and 171*d* for one or more of the optical pickups 210, 220, 230, and 240.

FIG. 2 illustrates a connection terminal (that is, the connection terminal 120) that the optical pickups 210, 220, 230, and 240 are connected to. In exemplary embodiments of the present general inventive concept, connection terminals 213, 223, 233, and 243 of the optical pickups 210, 220, 230, and 240 can be similar and/or identical to one another.

One or more of the optical pickups 210, 220, 230, and 240 can include one or more of resistors (e.g., Rpa, Rpb, Rpc, and Rpd), respectively, of which an end can be connected to a specific port of the connection terminals 213, 223, 233, and 243, the other end being connected to ground.

One or more of these resistors (Rpa, Rpb, Rpc, and Rpd) can have a different resistance. In exemplary embodiments of the present general inventive concept, each of the resistors (Rpa, Rpb, Rpc, and Rpd) can have a different resistance. Accordingly, it is possible to specify and/or select the optical pickups 210, 220, 230, and 240 according to the resistors (Rpa, Rpb, Rpc, and Rpd). Alternatively, one or more of the resistors can have a different resistance, and/or may have the same resistance.

In other words, the optical reproducing apparatus 100 may determine which optical pickup is connected to the connection terminal 120, by measuring the resistance of the resistors (Rpa, Rpb, Rpc, and Rpd) mounted on the optical pickups 210, 220, 230, and 240. That is, the optical reproducing apparatus can select an optical pickup to connect to the connection terminal 120 according to the measured resistance value of one or more of the resistors (e.g., Rpa, Rpb, Rpc, and Rpd) mounted on one or more of the optical pickups 210, 220, 230, and 240.

The optical reproducing apparatus 100 may drive the optical pickup using firmware (e.g., a selected firmware) for the optical pickup connected to the connection terminal 120. That is, the firmware may drive the selected optical pickup that is connected to the connection terminal 120.

For better understanding, the connection terminal 233 of the optical pickup (PU-C) 230 is connected to the connection terminal 120 of the optical reproducing apparatus 100, thereby connecting the optical pickup (PU-C) 230 to the optical reproducing apparatus 100.

The F/E 140 can measure a resistance of the resistor (Rpc) on a specific port (Pn) of the connection terminal 120. The resistance of the resistor (Rpc) can be measured as the power transferring circuit 130 transfers power to the resistor (Rpc) connected to the specific port (Pn) of the connection terminals 120, 233 through the resistor (Rm).

Since the F/E 140 is aware (e.g., receives the value via a signal) of the amount of the power (V) and the resistance of the resistor (Rm), it can calculate and/or determine the resistance of the resistor (Rpc) by measuring the voltage on the specific port (Pn) of the connection terminal 120.

The calculated resistance can correspond to the resistor (Rpc). Accordingly, the F/E 140 can recognize and/or determine that the optical pickup (PU-C) 230 is connected to the connection terminal 120, and can drive the optical pickup (PU-C) 230 using the firmware 171*c* among the firmware 171*a*, 171*b*, 171*c*, and 171*d* stored in the memory 170.

Figure 3:
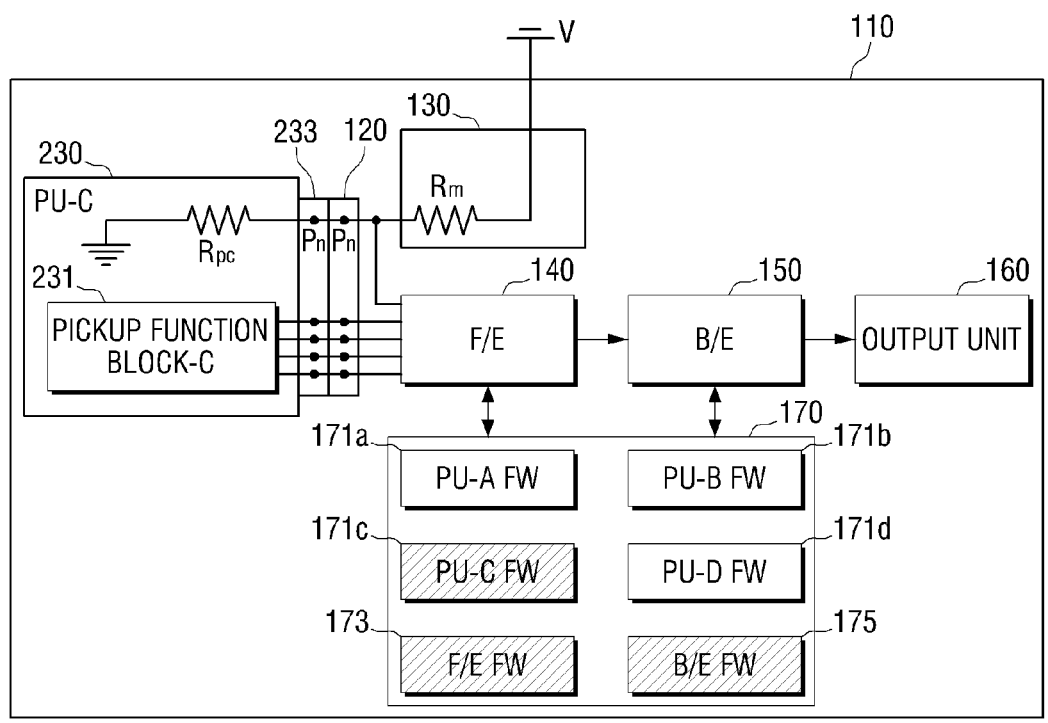
FIG. 3 is a view illustrating an optical reproducing apparatus on which an optical pickup (PU-C) is mounted according to exemplary embodiments of the present general inventive concept.

In FIG. 3, the PU-C firmware 171*c*, F/E FW 173 which is used to drive the F/E 140, and B/E FW 175 which is used to drive the B/E 150 are marked by oblique lines to illustrate that the firmware 171*c* can drive the optical pickup (PU-C) 230.

Hereinbelow, the process that the optical reproducing apparatus 100 determines the type of optical pickup which is connected to the connection terminal 120 and thus mounted on the optical reproducing apparatus 100, and controls the optical pickup according to the determination result will be explained in detail with reference to FIG. 4.

Figure 4:
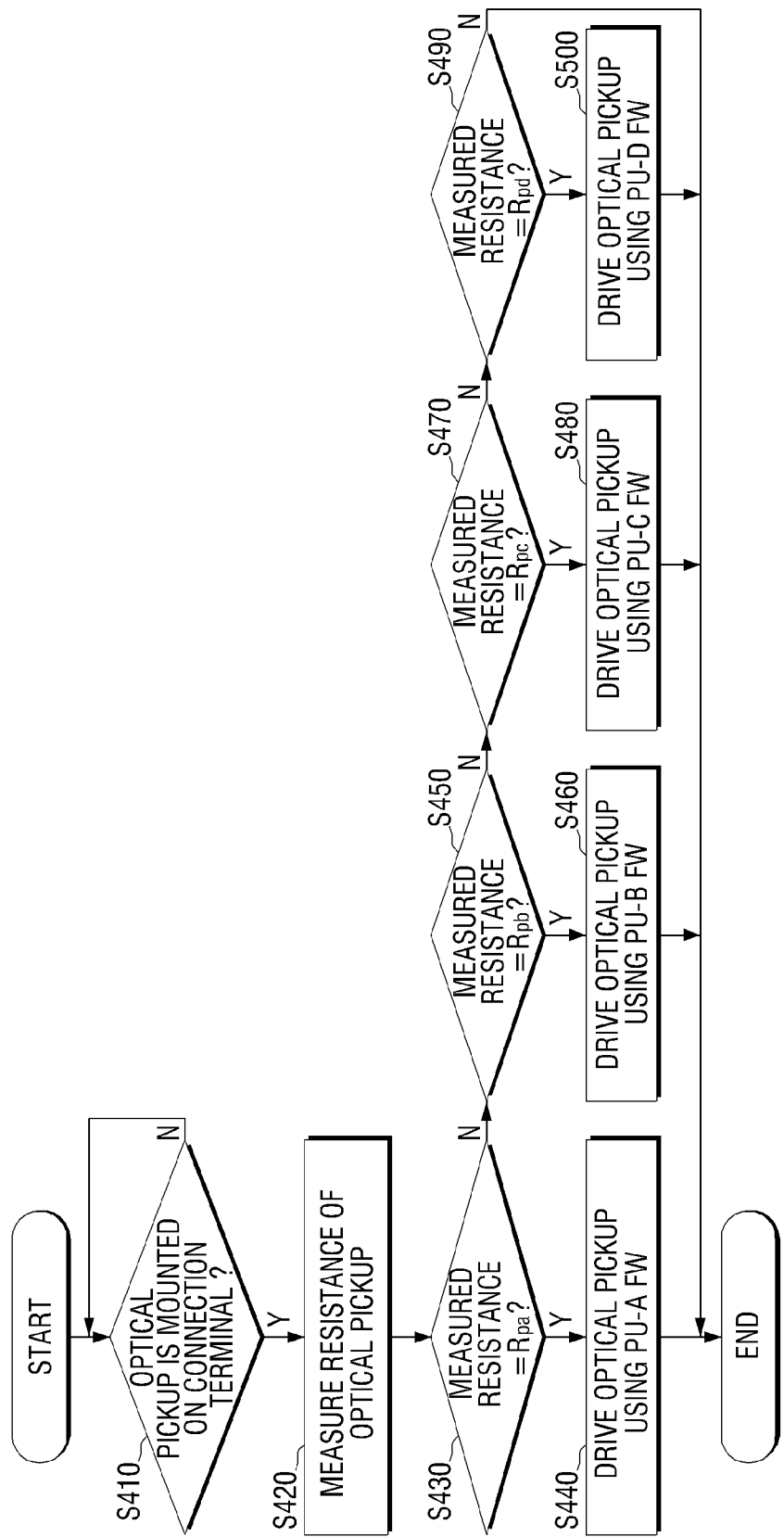
FIG. 4 is a flowchart illustrating a method of controlling an optical pickup according to exemplary embodiments of the present general inventive concept.

FIG. 4 is a flowchart illustrating a method of controlling an optical pickup according to exemplary embodiments of the present general inventive concept.

As illustrated in FIG. 4, if it is determined that an optical pickup is connected to and mounted on the connection terminal 120 in operation S410, the F/E 140 can measure the resistance of the optical pickup on the specific port (Pn) of the connection terminal 120 in operation S420.

In operation S410, if the specific port (Pn) of the connection terminal 120 is not open, it may be determined that the optical pickup is connected to and/or mounted on the connection terminal 120.

Measuring the resistance of the optical pickup in operation S420 may be performed using the power (V) which the power transferring circuit 130 transfers to the connection terminal 120.

If it is determined that the resistance measured in operation S420 corresponds to the resistor (Rpa) in operation S430-Y, the F/E 140 can drive the optical pickup with the firmware (PU-A FW) 171*a* in operation S440. That is, when the resistance of the optical pickup corresponds to the resistor (Rpa), the optical pickup connected to the connection terminal 120 can be the optical pickup (PU-A) 210.

If it is determined that the resistance measured in operation S420 corresponds to the resistor (Rpb) in operation S450-Y, the F/E 140 can drive the optical pickup using the firmware (PU-B FW) 171*b* in operation S460. That is, when the resistance of the optical pickup corresponds to the resistor (Rpb), the optical pickup connected to the connection terminal 120 can be the optical pickup (PU-B) 220.

If it is determined that the resistance measured in operation S420 corresponds to the resistor (Rpc) in operation S470-Y, the F/E 140 can drive the optical pickup with the firmware (PU-C FW) 171*c* in operation S480. That is, when the resistance of the optical pickup corresponds to the resistor (Rpc), the optical pickup connected to the connection terminal 120 can be the optical pickup (PU-C) 230.

If it is determined that the resistance measured in operation S420 corresponds to the resistor (Rpd) in operation S490-Y, the F/E 140 can drive the optical pickup with the firmware (PU-D FW) 171*d* in operation S500. That is, when the resistance of the optical pickup corresponds to the resistor (Rpd), the optical pickup connected to the connection terminal 120 can be the optical pickup (PU-D) 240.

There is no limitation on the optical disc from which the optical reproducing apparatus 100 can read out data, is not limited in the exemplary embodiments of the present general inventive concept. That is, the features and utilities of the present general inventive concept may be applied to any optical reproducing apparatus whether it reads out data from a blu-ray disc (BD), a compact disc (CD), a digital versatile disc (DVD), and/or any other suitable optical media to carry out the exemplary embodiments of the present general inventive concept as disclosed herein.

The power transferring circuit 130 provided in the exemplary embodiments of the present general inventive concept is also exemplary, and the power transferring circuit 130 may be replaced with a power transferring circuit which includes, for example, a current mirror.

In the exemplary embodiments of the present general inventive concept, resistance of an optical pickup can be measured on a single port. The resistance of the optical pickup may also be measured on two ports so as to determine the type of optical pickup. That is, when one or more types of optical pickups are used, the types of optical pickups can be specified by combining the resistors.

For example, if the voltage measured on each of first and second ports corresponds to resistors (R1, R1), a first optical pickup can be connected with an optical reproducing apparatus, if the voltage measured on each of first and second ports corresponds to resistors (R1, R2), a second optical pickup can be connected with an optical reproducing apparatus, if the voltage measured on each of first and second ports corresponds to resistors (R2, R1), a third optical pickup can be with an optical reproducing apparatus, and if the voltage measured on each of first and second ports corresponds to resistors (R2, R2), a fourth optical pickup can be connected with an optical reproducing apparatus.

At least four types of optical pickups are provided in exemplary embodiments of the present general inventive concept, but this is merely exemplary. The type and the number of optical pickups may be changed as occasion demands.

In exemplary embodiments of the present general inventive concept, different firmware 171*a*, 171*b*, 171*c*, and 171*d* can be provided for each of the optical pickups 210, 220, 230, and 240, but this may be merely exemplary for the convenience of description. Alternatively, the firmware 171*a*, 171*b*, 171*c*, and 171*d* for the optical pickups 210, 220, 230, 240 can be unified into a single firmware.

In exemplary embodiments of the present general inventive concept, firmware can be stored in the memory 170. However, the firmware can be programmed such that one or more of the optical pickups 210, 220, 230, and 240 (e.g., each of the optical pickups) has a different margin (X) set to drive the optical pickup.

For example, the firmware can be programmed such that each of the optical pickups 210, 220, 230, and 240 has a different margin for the value (X) set to drive an optical pickup. The margin represents the range of X to stably drive the optical pickup.

if [optical pickup-A(PU-A)]

$$1<X<10,$$

else if [optical pickup-B(PU-B)]

$$5<X<15,$$

else if [optical pickup-C(PU-C)]

$$3<X<13,$$

else if [optical pickup-D(PU-D)]

$$2<X<12$$

In these exemplary embodiments of the present general inventive concept, the elements of the optical reproducing apparatus can be provided on a single printed circuit board (PCB), but this is also merely exemplary. The elements may be divided and provided on two PCBs.

As described above, according to the exemplary embodiments of the present general inventive concept, the type of optical pickup may be determined with reference to the resistance of the optical pickup connected to the optical reproducing apparatus. Accordingly, an optical reproducing apparatus may be efficiently controlled according to the type of optical pickup, and may be manufactured conveniently using various optical pickups without checking the type of optical pickups.

In addition, replacing an optical pickup with another becomes easier, and there is no need to keep an old type of optical pickup for replacement of the broken optical pickup.

Furthermore, when a user upgrades firmware via the Internet, the optical reproducing apparatus may automatically determine the type of optical pickup.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An optical reproducing apparatus, comprising:
    a connection unit connected to an optical pickup; and
    a front end to measure resistance of the optical pickup on a port of the connection unit, and to determine a type of the optical pickup according to the measured resistance.

2. The optical reproducing apparatus of claim 1, wherein the front end measures resistance of the optical pickup on the port with power supplied to a printed circuit board (PCB) having the front end.

3. The optical reproducing apparatus of claim 2, wherein an end of the optical pickup on the port is connected to ground.

4. The optical reproducing apparatus of claim 1, further comprising:
    a memory to store firmware in which margin set to drive the optical pickup is programmed differently according to the optical pickup,
    wherein the front end drives the optical pickup connected to the connection unit with the firmware stored in the memory according to the determined type of the optical pickup.

5. The optical reproducing apparatus of claim 1, further comprising:
    a memory to store firmware to drive the optical pickup according to the type of the optical pickup,
    wherein the front end drives the optical pickup connected to the connection unit with one of firmware stored in the memory.

6. A method of controlling an optical pickup, the method comprising:
    measuring resistance of the optical pickup on a port among a plurality of ports connected to the optical pickup; and
    determining a type of optical pickup connected to an optical reproducing apparatus according to the measured resistance.

7. The method of claim 6, wherein the measuring comprises:
    measuring resistance of the optical pickup on the port with power that the optical reproducing apparatus supplies to the port.

8. The method of claim 7, wherein an end of the optical pickup on the port is connected to ground.

9. The method of claim 6, further comprising:
    driving the optical pickup with firmware in which margin set to drive the optical pickup is programmed differently at least according to the determined type of the optical pickup.

10. The method of claim 6, further comprising:
driving the optical pickup with firmware selected according to the determined type of the optical pickup.

11. An optical pickup to read out data from an optical disc, the optical pickup comprising:
a connection unit connected to an optical reproducing apparatus to transmit the data to the optical reproducing apparatus; and
a resistor including an end connected to a port of the connection unit and resistance specifying a type of the optical pickup.

12. The optical pickup of claim 11, wherein the resistance of the resistor determines at least in part the type of the optical pickup of the optical reproducing apparatus.

13. The optical pickup of claim 11, wherein the other end of the resistor is connected to ground.

14. A method of controlling an optical reproducing apparatus, the method comprising:
determining when an optical pickup is connected to a connection terminal of the optical reproducing apparatus;
measuring the resistance of the connected optical pickup; and
driving the optical pickup of the optical reproducing apparatus according to the measured resistance.

15. The method of claim 14, further comprising:
reading out data from an optical disk with the driven optical pickup.

16. The method of claim 15, further comprising:
outputting the read data with an output unit to an image output element of the optical reproducing apparatus.

17. The method of claim 15, further comprising:
outputting the read data with an output unit of the optical reproducing apparatus to an external image output device.

* * * * *